United States Patent
Kristiansson et al.

(10) Patent No.: US 10,785,334 B2
(45) Date of Patent: Sep. 22, 2020

(54) IMPLANTED AGENT WITHIN A FIRST SERVICE CONTAINER FOR ENABLING A REVERSE PROXY ON A SECOND CONTAINER

(71) Applicant: TELEFONAKTIEBOLAGET LM ERICSSON (PUBL), Stockholm (SE)

(72) Inventors: Johan Kristiansson, Luleå (SE); Daniel Bergström, Luleå (SE); Jonas Lundberg, Luleå (SE); Nicklas Sandgren, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 114 days.

(21) Appl. No.: 15/578,077

(22) PCT Filed: Mar. 15, 2016

(86) PCT No.: PCT/EP2016/055533
§ 371 (c)(1),
(2) Date: Nov. 29, 2017

(87) PCT Pub. No.: WO2016/192866
PCT Pub. Date: Dec. 8, 2016

(65) Prior Publication Data
US 2018/0152534 A1 May 31, 2018

Related U.S. Application Data

(60) Provisional application No. 62/170,274, filed on Jun. 3, 2015.

(51) Int. Cl.
*H04L 29/08* (2006.01)
*G06F 16/22* (2019.01)
(Continued)

(52) U.S. Cl.
CPC .............. *H04L 67/28* (2013.01); *G06F 8/20* (2013.01); *G06F 8/60* (2013.01); *G06F 16/2255* (2019.01);
(Continued)

(58) Field of Classification Search
CPC . H04L 67/28; H04L 67/1002; H04L 67/1031; H04L 67/16; H04L 67/2814; G06F 16/2255; G06F 8/20; G06F 8/60
See application file for complete search history.

(56) References Cited

U.S. PATENT DOCUMENTS 8,904,524 B1\* 12/2014 Hodgman ............... G06F 21/56
726/22
2007/0112574 A1\* 5/2007 Greene ............. H04W 12/0804
340/572.1
(Continued)

FOREIGN PATENT DOCUMENTS

WO 2015171030 A1 11/2015
WO 2016099346 A1 6/2016

OTHER PUBLICATIONS

Padmanabhan et al, Indroducing the first NetflixOSS Recipie: RSS reader, Mar. 11, 2013, The Netflix Tech Blog, 7 pages, https://medium.com/netflix-techblog/introducing-the-first-netflixoss-recipe-rss-reader-fd85da8a53ff (Year: 2013).\*
(Continued)

*Primary Examiner* — Patrice L Winder
*Assistant Examiner* — Aye M Aung
(74) *Attorney, Agent, or Firm* — Sage Patent Group

(57) ABSTRACT

It is presented a method performed by a first software container comprising an implanted agent, which is configured to run in said first software container. The method comprise the steps, performed by the implanted agent, of: resolving an Internet Protocol, IP, address and a port of the
(Continued)

first software container; and registering a microservice identity, the IP address and the port of the first software container in a first distributed hash table for enabling a second implanted agent running in a second software container to configure a reverse proxy running in the second software container.

6 Claims, 7 Drawing Sheets

(51) Int. Cl.
G06F 8/20 (2018.01)
G06F 8/60 (2018.01)

(52) U.S. Cl.
CPC ...... *H04L 67/1002* (2013.01); *H04L 67/1031* (2013.01); *H04L 67/16* (2013.01); *H04L 67/2814* (2013.01); *H04L 67/10* (2013.01)

(56) References Cited

U.S. PATENT DOCUMENTS

| | | | | |
|---|---|---|---|---|
| 2010/0299437 | A1* | 11/2010 | Moore | H04L 67/1008 709/226 |
| 2013/0244614 | A1* | 9/2013 | Santamaria | H04L 51/04 455/411 |
| 2015/0161681 | A1* | 6/2015 | Maes | G06F 9/546 705/14.72 |
| 2016/0094653 | A1* | 3/2016 | Balasubramanian | H04L 67/1057 709/217 |
| 2016/0205518 | A1* | 7/2016 | Patel | H04L 65/1073 455/518 |
| 2017/0347371 | A1* | 11/2017 | Prins | H04L 12/43 |

OTHER PUBLICATIONS

Qiagdavidliu, Eureka at a glance, Dec. 18, 2014, 6 pages, https://github.com/Netflix/eureka/wiki/Eureka-at-a-glance (Year: 2014).*
Patel, Getting Started with Microservices using Netflix OSS & Docker, Aug. 13, 2014, Nirmata, https://www.nirmata.com/2014/08/13/getting-started-with-microservices-using-netflix-oss-docker/ (Year: 2014).*
Patel, Service discovery and dynamic request routing with Nirmata, Feb. 18, 2015, Nirmata, https://www.nirmata.com/2015/02/18/service-discovery-and-dynamic-request-routing-with-nirmata/ (Year: 2015).*
Patel, Getting Started with Microservices using Netflix OSS & Docker, Aug. 13, 2014, Nirmata, https://www.nirmata.com/2014/08/ 13/getting-started-with-microservices-using-netflix-oss-docker/ (Year: 2014).*
Padmanabhan et al, Indroducing the first NetflixOSS Recipie: RSS reader, Mar. 11, 2013, The Netflix Tech Blog, 7 pages,& nbsp;https://medium.com/netflix-techblog/introducing-the-first-netflixoss-recipe-rss-reader-fd85da8a53ff (Year: 2013).*
Long etal, Microservice Registration and Discovery with Spring Cloud and Netflix's Eureka, Jan. 20, 2015, 1 page, https://spring.io/blog/2015/01/20/microservice-registration-and-discovery-with-spring-cloud-and-netflix-s-eureka (Year: 2015).*
Newman, Sam: "Building Microservices", Designing Fine-Grained Systems, O'Reilly, Published in 2015, 280 pages.
International Search Report and Written Opinion issued in Application No. PCT/EP2016/055533 dated Jun. 8, 2016, 9 pages.
https://github.com; QubitProducts/bamboo;"HAProxy auto configuration and auto service discovery for Mesos Marathon", © 2015 GitHub, Inc., 9 pages.
Burgess, M., "Theory and Practice of Configuration Management in decentralized Systems", Abstract, Oslo University College, Norway, © 2006 IEEE, 1 page.
https://github.com; "Manage local application configuration files using templates and data from etcd or consul", © 2015 GitHub, Inc., 2 pages.
https://en.wikipedia.org/w/index.php?title=Configuration_management &oldid=691517192; Nov. 2015, 11 pages.
http://gocircuit.github.io/circuit; "Circuit: Self-managed infrastructure, programmatic monitoring and orchestration" Nov. 2015, 2 pages.
https://coreos.com/etcd/docs/latest; "Distributed reliable key-value store for the most critical data of a distributed system", © 2015 GitHub, Inc., 4 pages.
Hykes, S., "Docker (software)", From Wikipedia, the free encyclopedia, Mar. 2013, 11 pages.
HAProxy: "The Reliable, High Performance TCP/HTTP Load Balancer", Nov. 2015, 16 pages.
Hindman, B., et al., "Mesos: A Platform for Fine-Grained Resource Sharing in the Data Center", University of California, Berkeley, May 2010, 14 pages.
https://github.com; "Container Cluster Manager from Google http://kubernetes.io", © 2015 GitHub, Inc., 4 pages.
Download Marathon v0.11.1 (http://downloads.mesosphere.com/marathon/v0.11.1/marathon-0.11.1.tgz), "Marathon: A cluster-wide init and control system for services in cgroups or Docker containers", © 2015 Mesosphere, Inc. (http://mesosphere.com), 2 pages.
Maymounkov, P. and Mazieres, D., "Kademlia: A Peer-to-peer Information System Based on the XOR Metric", http://kademlia.scs.cs.nyu.edu, Oct. 2002, 6 pages.
https://github.com; "AWS Service registry for resilient mid-tier load balancing and failover", Netflix/eureka, © 2015 GitHub, Inc., 2 pages.
Cockcroft, A., "NetflixOSS—A Cloud Native Architecture", LASER Sessions 2&3—Overview, 10th Laser Summer School on Software Engineering, XP055276156, Sep. 2013, 86 pages.
Hunt, P., et al., "ZooKeeper: Wait-free coordination for Internet-scale systems", 2010, 14 pages.
Pendry, J.-S., et al., "Union Mounts in 4.4BSD-Lite", Winter USENIX Conference Proceedings, 1995, 15 pages.
Rowstron, A. and Druschel, P., "Pastry: Scalable, decentralized object location and routing for large-scale peer-to-peer systems", Microsoft Research Ltd, Cambridge, UK and Rice University, Houston, TX, USA, Appears in Proc. of the 18th IFIP/ACM International Conference on Distributed Systems Platforms (Middleware 2001), Heidelberg, Germany, Nov. 2001, 22 pages.
Salaün, G., et al., "Verification of a Self-configuration Protocol for Distributed Applications in the Cloud", 2012, Riva del Garda, Italy, 6 pages.
https://github.com/hashicorp/ serf; "Serf is a decentralized solution for cluster membership, failure detection, and orchestration. Lightweight and highly available.", © 2015. A HashiCorp (http://www.hashicorp.com) Project; 4 pages.
Stoica, I., et al., "Chord: A Scalable Peer-to-peer Lookup Service for Internet Applications", San Diego, CA, USA, 2001, 12 pages.

* cited by examiner

Microservices SetMap 20

| Key | Value(s) |
|---|---|
| Proxy_server | 150.90.140.1:80, 160.12.18.1:80 |
| Microservices | cmm, statistics |

Protocol Settings SetMap 21

| Key | Value |
|---|---|
| cmm | Protocol: HTTP TargetPath: / path: /conference |
| statistics | Protocol: HTTP TargetPath: / path: /stat |

Containers SetMap 22

| Key | Value(s) |
|---|---|
| cmm | 192.168.1.23:1234, 192.168.23.213:4321, 192.168.23.214.4323 ... |
| statistics | 192.168.18.34:1111, 192.168.23.217:2222, ... |

IMPLANTED AGENT WITHIN A FIRST SERVICE CONTAINER FOR ENABLING A REVERSE PROXY ON A SECOND CONTAINER

CROSS REFERENCE TO RELATED APPLICATION(S)

This application is a 35 U.S.C. § 371 National Stage of International Patent Application No. PCT/EP2016/055533, filed Mar. 15, 2016, designating the United States and claiming priority to U.S. provisional application No. 62/170,274, filed on Jun. 3, 2015. The above identified applications are incorporated by reference.

TECHNICAL FIELD

The invention relates to a method, data processing systems, a computer program and a computer program product for using an implanted agent to enable a reverse proxy.

BACKGROUND

There is a constant development in tools and cloud platforms to make it easier to develop new applications and services while also decreasing operational costs associated with online hosting. Example of services could be a web based video conferencing or an online collaboration tool. Another example could be multimedia TV services, or in fact any application that can be containerized.

To provide services in a cost efficient way it is important that the development cost, capital expenditure (Capex) and the cost of hosting services, operational expenditure (Opex) are kept as low as possible. Consequently, there is a need to automatically manage application components such as microservices.

Microservices has recently become a popular architecture to build modern Web services. By breaking down a complex monolithic application into small independent services it becomes possible to develop applications that are more scalable and more resilient to errors. For example, if a certain microservice fails, it does not affect the entire application, assuming the microservice is replicated on multiple instances. However, if a component part of a monolithic service would fail, the entire service would have to be restarted. Also, the only way to scale a monolithic service is to duplicate the whole monolith by adding more instances of it. In a microservice architecture on the other hand, only the microservices that need to be scaled need to be replicated.

For some applications, it can make sense to dynamically start and stop microservices and only run them for a limited amount of time. For example, in a video conferencing application it can make sense to start a new video mixer microservice for each new communication session or conference room. As a result, the video conferencing application becomes easy to scale horizontally as new video mixers are deployed on demand. Also, if a video mixer crashes, the failure is isolated to a single session and does not affect the stability of the entire application.

Reverse proxy servers are important components in microservices architectures. In short, a reverse proxy is a server component that receives a request from a client (e.g. Web browser client) and establishes a new connection to a server and then re-sends the server reply to the client so that the reply looks like it originates from the proxy server and not the server.

Reverse proxy servers are commonly used to implement load balancing, caching, and managing software upgrades. It can also be used to provide external access to internal component running on an internal network. Typically, in many cloud environments, server components such as microservices are only assigned private IP addresses and dynamically assigned TCP/UDP ports not accessible from the Internet. In this case, a reverse proxy can be used to redirect external traffic to a particular microservice. This requires a flexible and scalable configuration framework to dynamically configure microservices and proxy servers, particularly if microservices are transient and frequently started and stopped, or if there is a large amount of microservices deployed.

Software containers are another important component for building efficient microservices architectures. A container enables a microservice to be sandboxed and run independently of other microservices, even on the same host. In contrast to virtual machines, containers are more lightweight and can instantly be started, similar to standard Unix processes. Another advantage of software containers is that they provide a reliable execution environment, which allows developers to develop and test microservices on local development computers before uploading them to a data centre while still being confident that the containers behave similarly as running them locally.

Over the last decades, there has been a significant amount of work done related to configuration management. One method to dynamically re-configure servers or services (e.g. web services or microservices) running on multiple nodes is to provide a global registry service and use clients running on remote servers to re-configure the servers when configuration settings in the registry are modified. Etcd is an example of distributed databases specifically designed for configuration management and coordinating configuration operations. In Etcd, a client can use a hanging HTTP request to get a notification when configuration settings are modified and then perform actions such as re-configure and restart the underlying server process. This is similar to Netflix's Eureka that provides an API (Application Programming Interface), which can be used by components such as microservices to register to the Eureka registry service and then receive re-configuration events.

Several frameworks have been developed to simplify re-configuration of server processes. Confd is a lightweight configuration management tool for keeping local configuration files up-to-date using data stored in database backends such as Zookeeper or Etcd. It allows developers to express templates to easily modify configuration files and restart server processes.

Work has also been done to provide automatic configuration management in cloud environments. For example, Bamboo is an auto configuration and service discovery framework specifically designed for the Mesos/Marathon platform and HAProxy, which is a reverse proxy server. It allows developers or operators to express ACL (Access Control List) rules using a template language similar to Confd. A Bamboo server then monitors the underlying platform and when it receives events from Marathon, it re-configures and restarts the HAProxy server accordingly to the specified template. As the templates are stored in Apache Zookeeper, Bamboo can synchronize and reconfigure multiple HAProxy servers simultaneously in one operation.

SUMMARY

It is an object to provide a solution where reverse proxies can be configured without the need for central control.

According to a first aspect, it is presented a method performed by a first software container comprising an implanted agent, which is configured to run in said first software container. The method comprises the steps, performed by the implanted agent, of: resolving an Internet Protocol, IP, address and a port of the first software container; and registering a microservice identity, the IP address and the port of the first software container in a first distributed hash table for enabling a second implanted agent running in a second software container to configure a reverse proxy running in the second software container.

The step of registering may comprises also registering a time to live value in association with the microservice identity.

The step of registering may be repeated regularly at an interval which is less than the time to live value.

The method may further comprise the step of: deploying a second software container for configuring a reverse proxy server; and deploying more instances of the first software container.

The steps of deploying the second software container and deploying more instances of the first software container may be performed when the first software container is overloaded.

According to a second aspect, it is presented a data processing system comprising a first software container comprising an implanted agent, the agent being associated with a processor; and a memory. The memory stores instructions that, when executed by the processor, cause the agent to: resolve an Internet Protocol, IP, address and a port of the first software container; and register a microservice identity, the IP address and the port of the first software container in a first distributed hash table for enabling a second implanted agent running in a second software container to configure a reverse proxy running in the second software container.

The instructions to register may comprise instructions that, when executed by the processor, cause the agent to also register a time to live value in association with the microservice identity.

The instructions to register may be repeated regularly at an interval which is less than the time to live value.

The data processing system may further comprise instructions that, when executed by the processor, cause the agent to: deploy a second software container for configuring a reverse proxy server; and deploy more instances of the first software container.

The data processing may further comprise instructions that, when executed by the processor, cause the agent to perform the deploying of second software container for configuring a reverse proxy server; and deploying more instances of the first software container when the first software container is overloaded.

According to a third aspect, it is presented a data processing system comprising: means for resolving an Internet Protocol, IP, address and a port of the first software container, the means for resolving forming part of an implanted agent of a first software container of the data processing system; and means for registering a microservice identity, the IP address and the port of the first software container in a first distributed hash table for enabling a second implanted agent running in a second software container to configure a reverse proxy running in the second software container, the means for registering forming part of the implanted agent.

According to a fourth aspect, it is presented a computer program for an implanted agent in a first software container. The computer program comprises computer program code which, when run on an implanted agent causes the implanted agent to: resolve an Internet Protocol, IP, address and a port of the first software container; and register a microservice identity, the IP address and the port of the first software container in a first distributed hash table for enabling a second implanted agent running in a second software container to configure a reverse proxy running in the second software container.

According to a fifth aspect, it is presented a computer program product comprising a computer program according to the fourth aspect and computer readable means on which the computer program is stored.

According to a sixth aspect, it is presented a method performed by a second software container comprising a second implanted agent. The method comprises the steps, performed by the second implanted agent, of: obtaining a microservice identity registered in a first distributed hash table, the microservice identity having been registered by a first implanted agent of a first software container; and configuring a reverse proxy running in the second software container using the microservice identity.

The step of obtaining may comprise obtaining an IP address and port of the first software container stored in association with the microservice identity; and wherein the step of configuring the reverse proxy comprises using the IP address and port.

The method may further comprises the step of: configuring the reverse proxy running in the second software container by removing an absent microservice identity from the proxy when the absent microservice identity has been removed from the first distributed hash table.

The method may further comprise the step of: obtaining, for a microservice identity, a protocol type, a frontend postfix path and a target path; and configuring the reverse proxy to use the protocol type, frontend postfix path and target path.

According to a seventh aspect, it is presented a data processing system comprising a second software container comprising an implanted agent associated with a processor; and a memory. The memory stores instructions that, when executed by the processor, cause the agent to: obtain a microservice identity registered in a first distributed hash table, the microservice identity having been registered by a first implanted agent of a first software container; and configure a reverse proxy running in the second software container using the microservice identity.

The instructions to obtain may comprise instructions that, when executed by the processor, cause the agent to obtain an IP address and port of the first software container stored in association with the microservice identity; and the instructions to configure the reverse proxy may comprise instructions that, when executed by the processor, cause the agent to use the IP address and port.

The data processing system may further comprise instructions that, when executed by the processor, cause the agent to: configure the reverse proxy running in the second software container by removing an absent microservice identity from the proxy when the absent microservice identity has been removed from the first distributed hash table.

The data processing system may further comprise instructions that, when executed by the processor, cause the agent to: obtain, for a microservice identity, a protocol type, a frontend postfix path and a target path; and configure the reverse proxy to use the protocol type, frontend postfix path and target path.

According to an eighth aspect, it is presented a data processing system comprising: means for obtaining a microservice identity registered in a first distributed hash table, the microservice identity having been registered by a first implanted agent of a first software container, wherein the data processing system comprises a second software container comprising an implanted agent associated with a processor; and means for configuring a reverse proxy running in the second software container using the microservice identity.

According to a ninth aspect, it is presented a computer program for an implanted agent in a first software container comprising computer program code which, when run on an implanted agent causes the implanted agent to: resolve an Internet Protocol, IP, address and a port of the first software container; and register a microservice identity, the IP address and the port of the first software container in a first distributed hash table for enabling a second implanted agent running in a second software container to configure a reverse proxy running in the second software container.

According to a tenth aspect, it is presented a computer program product comprising a computer program according to the ninth aspect and computer readable means on which the computer program is stored.

All existing configuration management tools and framework are generic and not specifically designed for microservices routing configuration. It would be desirable to have a framework which allows microservices to manage their own routing. For example, allowing a microservice to gracefully stop itself by de-registering from a proxy server to prevent new connections and wait until existing connections are closed. It would also be desired for microservices to create their own clusters in a plug-and-play fashion. This is currently not supported in existing tools and frameworks.

Also, many existing tools require a platform which itself can be difficult to deploy and manage. Another drawback is that developers become vendor locked to a specific platform, which makes it hard to switch platform or utilize multiple platforms at the same time. It would therefore be desirable to allow the containers to manage their own routing without being dependent on an external platform.

Yet another problem with existing state-of-the-art is that they typically require modification of the microservices code. For example, a microservice must be modified to use the Netflix's Eureka service discovery framework. From a reusability point of view, it would be beneficial to be able to take any existing container image and just deploy it without customizing the microservice running in the container.

Hence, the embodiments address the problem how to manage routing within an application consisting of containerized microservices, in particular how to manage load balancing and external access to microservices running in a data centre to create a loosely coupled and decentralized network of microservices. This is particularly important when designing and implementing applications with a high churn rate of microservices, or in a complex deployment consisting of a large amount of microservices where configuration becomes difficult and time consuming.

According to the embodiments presented herein, microservices are allowed to manage routing (routes) in a decentralized way rather than using a centralized controller to manage the routing (as done in all existing platforms today).

In the proposed embodiments configuration data is stored in a distributed database, which is tracked by a remote configuration clients to re-configure proxy servers. The main difference is that the proposed embodiments do not require external platform support or a central controller to manage configuration of proxy servers. Another difference is that Bamboo is mainly designed for service discovery where the proposed embodiments are mainly designed to provide external access and load balancing to manage routing in a loosely connected network of microservices.

Work has also been done to provide decentralized configuration management. CFEngine is a tool for setting up and maintaining configuration across a network of hosts. By letting every device or service component run a CFEngine agent, globally defined policies can be enforced by the agents. Although it is agent based, it is more static and requires modification of the microservices to support the CFEngine similar to Netflix Eureka. Also, although the configuration management itself is decentralized, it is not designed to implement self-managed and decentralized microservices that can dynamically re-configure proxy servers to manage routing.

One difference between the embodiments compared to existing state-of-the-art, is that the proposed solution is designed to create a self-managed decentralized network of containerized microservices. To allow microservices to manage their own routing such as allowing them to set up their own clusters and manage load balancing, or to set up their own external gateways—and without requiring any modification of containerized microservices.

The embodiments are based on two types of agents, service agents and routing agents that interact indirectly via a Distributed Hash table (DHT) called Bitverse. The service agent is configured to be responsible for registering a microservice in Bitverse and the routing agent is configured to be responsible for configuring proxy servers accordingly.

Further, embodiments are based on process injection to transparently handle service registration and proxy configuration without modifying existing microservices and container images. Before a container image is deployed it is implanted with a service agent process that is responsible for registering the container to Bitverse.

The containers of the embodiments are configured to host Bitverse nodes themselves, thus making it possible to implement a decentralized system where the Bitverse network is managed by the containers, or it is possible to setup an external Bitverse network. From this point, Bitverse is similar to Etcd or Zookepper, except that it is possible to implement a decentralized system where the containers themselves are collectively responsible providing all functions required by the embodiments.

When building applications based on the proposed embodiment, there are two main types of containers, microservice containers, which are containers configured to run ordinary microservices, but implanted with service agents. The other container type is called routing containers, which are configured to act as gateways to other microservices. A routing container can for example be used to provide external access to the Internet for a specific microservice container, or load balance incoming traffic, thus make it possible to create clusters of microservices.

A routing container is configured to run a reverse proxy server internally, or some other component/network function capable of routing or proxying network connections, e.g. a SDN (Software defined network) function. Similar to a microservice container, a routing container is also implanted with an agent, a so-called routing agent, which is responsible for configuring the internal reverse proxy server. The routing agent is configured to read routing configuration information in the Bitverse DHT network. By subscribing to configuration information and container registration stored in Bitverse, it is configured to automatically configure the reverse proxy server accordingly. As all states are stored in the Bitverse network, it becomes possible to implement a loosely connected network of containers where both microservice containers and routing containers can dynamically be added or removed. By using the embodiments, it also becomes possible for a microservice container to deploy a new routing container on demand to dynamically create clusters, i.e. without relying on a central controller to setup the cluster. This feature is discussed more below.

According to first aspects of the embodiments, a first software container and a method thereof are provided. The first software container comprises an implanted agent, which is configured to run in said first software container, wherein the agent is configured to register a microservice identity in a distributed hash table enabling a second implanted agent running in a second software container to configure a reverse proxy running in the second software container.

According to a further aspect, a first software container comprising an implanted agent is provided. The agent is associated with a processor; and a memory storing instructions that, when executed by the processor, cause the agent to: run in said first software container, and to register a microservice identity in a distributed hash table enabling a second implanted agent running in a second software container to configure a reverse proxy running in the second software container.

According to a further aspect, a first software container comprising an implanted agent is provided. The agent comprises means for running in said first software container, and means for registering a microservice identity in a distributed hash table enabling a second implanted agent running in a second software container to configure a reverse proxy running in the second software container.

According to a further aspect a computer program for an implanted agent in a first software container is provided. The computer program comprising computer program code which, when run on an implanted agent causes the implanted agent to: run in said first software container, and to register a microservice identity in a distributed hash table enabling a second implanted agent running in a second software container to configure a reverse proxy running in the second software container.

According to a yet further aspect a computer program product is provided. The computer program product comprises a computer program according to the aspect above and computer readable means on which the computer program is stored.

According to further aspects of the embodiments a second software container and a method thereof is provided. The second software container comprises a second implanted agent adapted to configure a reverse proxy running in the second software container by using a microservice identity registered in a distributed hash table. The microservice identity is registered by a first implanted agent in a first software container.

According to a further aspect, a second software container comprising an implanted agent is provided. The agent is associated with a processor; and a memory storing instructions that, when executed by the processor, cause the agent to: configure a reverse proxy running in the second software container by using a microservice identity registered in a distributed hash table. The microservice identity is registered by another implanted agent in a first software container.

According to a further aspect, a second software container comprising an implanted agent is provided. The agent comprises means for configuring a reverse proxy running in the second software container by using a microservice identity registered in a distributed hash table. The microservice identity is registered by another implanted agent in a first software container.

According to a further aspect a computer program for an implanted agent in a second software container is provided. The computer program comprising computer program code which, when run on an implanted agent causes the implanted agent to: configure a reverse proxy running in the second software container by using a microservice identity registered in a distributed hash table. The microservice identity is registered by another implanted agent in a first software container.

According to a yet further aspect a computer program product is provided. The computer program product comprises a computer program according to the aspect above and computer readable means on which the computer program is stored.

There are several advantages of the proposed embodiments which enable creation of decentralized microservices and allowing microservices to manage themselves. The following text discusses possible advantages in more details.

Flexibility: A microservice (or container) can manage its own routing. This has several benefits. For example, it allows a microservice to gracefully stop by allowing it to modify external routing and starve itself by preventing new incoming connections.

The embodiments also allow microservices to dynamically set up clusters when needed, thus allowing the microservices themselves to re-configure the topology of the microservices infrastructure. For example, if a microservice determines that the load is too high it can clone itself and deploy a reverse proxy microservice to create and configure a cluster similar to a Kubernetes Pod, except that the cluster can dynamically be created in runtime. It also becomes possible to dynamically add more frontend servers (reverse proxy servers) in a plug-and-play fashion. In this case, new proxy servers can automatically configure themselves by reading configuration data store in the Bitverse network.

Security: The proposed embodiments could also be used to allow a microservice to temporary expose itself externally (e.g. on the Internet). A microservice can register a temporary URL (Uniform Resource Locator) and then de-register itself when it no longer should be accessed. This would be much more complicated to implement in a centralized architecture, especially if a large amount of microservices are deployed.

However, it should be mentioned that decentralization as proposed in the embodiments puts more requirements on security, for example more demands on managing certificates and encryption keys. However, managing encryption keys and providing a secure Public Key Infrastructure (PKI) is out of the scope of embodiments presented herein.

Platform independence: By making it possible for microservices to manage themselves instead of relying an external platform like Kubernetes or Mesos, it becomes possible to easily switch to another platform or even use multiple platforms at the same time, for exampling using a Docker and Mesos, even running on different data centres. This could also open for an interesting idea called Liquid containers, where containers can seamlessly move between execution environments, including end-user devices such as laptops or smart phones, or telecommunication equipment such as radio base stations, to create a ubiquitous cloud execution environment. Obviously, this would be much more difficult to implement if microservices were deeply dependent on the underlying platform.

Re-usability: As agents are injected into container images, the embodiments can be used on any existing container image and without modifying the microservices running in the container. This is an important property when developing re-usable microservice components.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
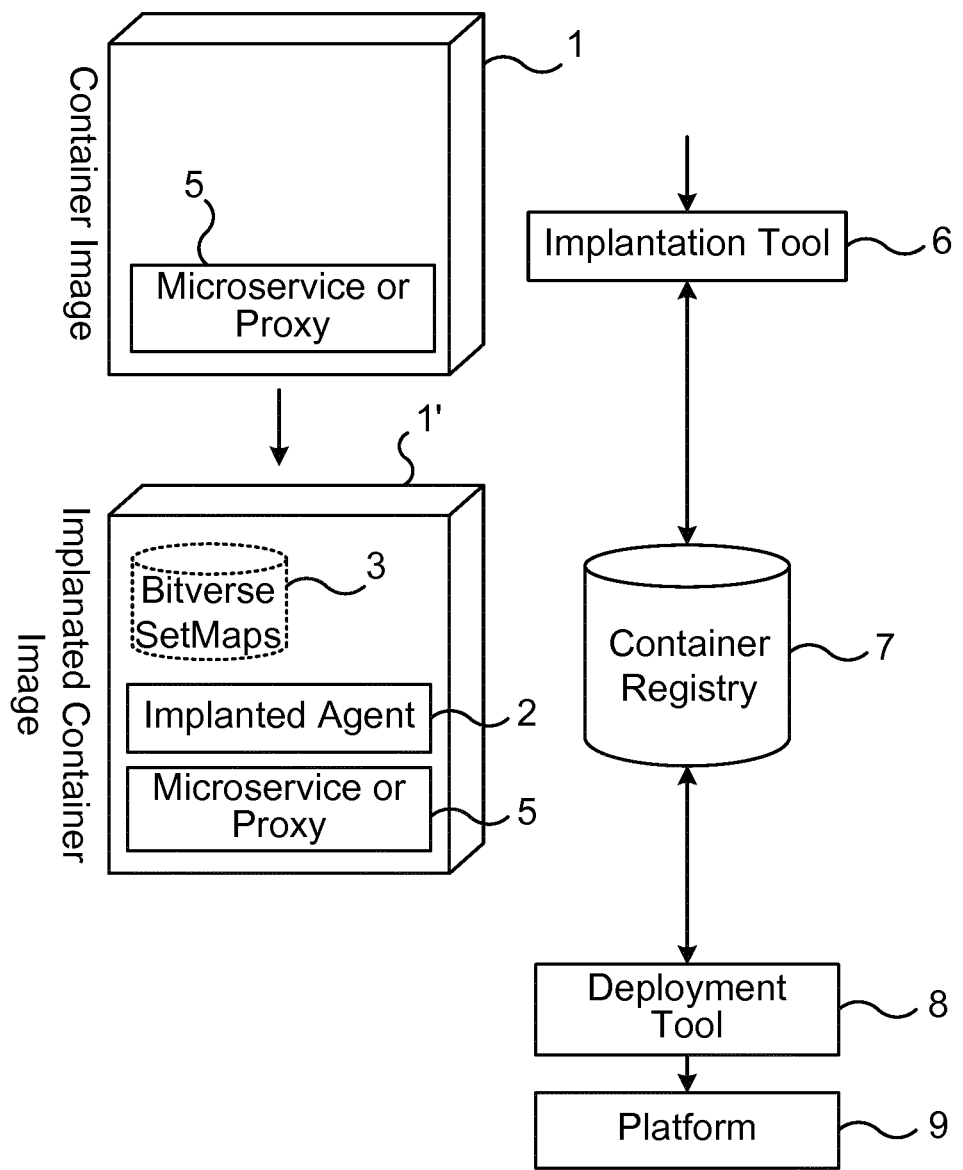
FIG. 1 is a schematic diagram illustrating how a container image is implanted with a service agent and then deployed.

FIG. 1 illustrates the process how a container image is implanted with a service agent and then deployed to a cloud platform.

An implantation tool 6 is provided with a container image URL and agent URL for one or more agents to be implanted. The container image and agent(s) are software modules comprising executable computer code, and are downloaded from a container registry 7 pointed to by the URL. A new container image is then built comprising both the main container image and implanted agent(s). Once done, the implantation tool 6 then uploads the implanted container image 1' to the container registry 7. The implanted container image 1' contains Bitverse SetMaps (described in more detail below), the implanted agent 2 and a microservice or proxy 5 (which was also included in the container image 1).

The deployment tool 8 downloads the implanted container image and deploys this to the platform 9.

Figure 2:
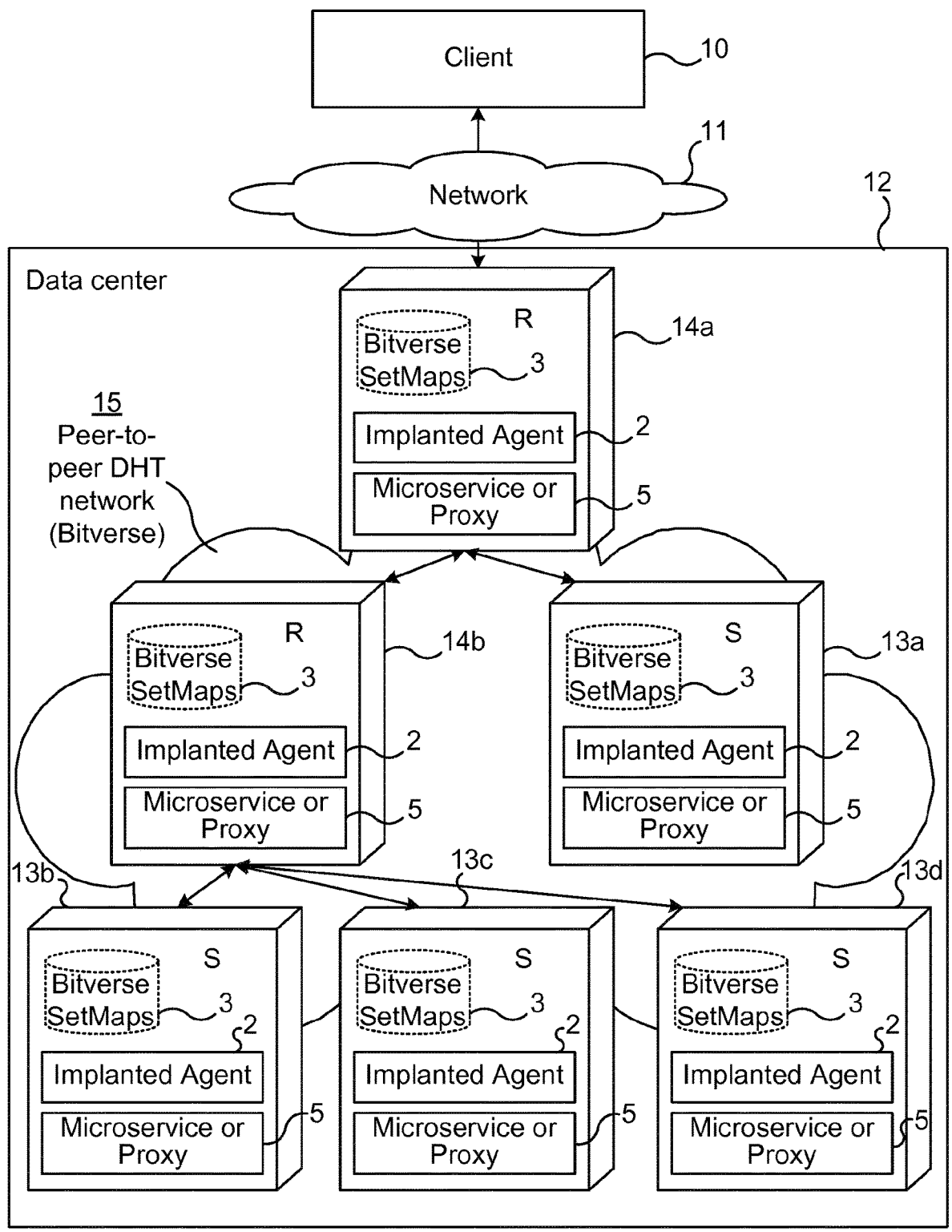
FIG. 2 is a schematic diagram illustrating a deployment of four microservice containers, and two routing containers running in a data centre.

FIG. 2 shows an example of a deployment consisting of four microservice containers 13a-d, and two routing containers 14a-b running in a data centre 12. The microservice containers 13a-d are marked with an "S" and the routing containers 14a-d are marked with an "R". The routing container 14a at the top of FIG. 2 acts as an external gateway, whereas the second routing container 14b acts as a load balancer to create a cluster.

Each routing container 14a-b contains Bitverse SetMaps 3, an implanted agent 2 and a microservice or proxy 5. Analogously, each service container 13a-d contains Bitverse SetMaps 3, an implanted agent 2 and a microservice or proxy 5. All routing containers 14a-b and all service containers 13a-d are part of a peer-to-peer DHT network 15.

A client to can e.g. be a smartphone, computer, etc. that connects to the data center 12 over a network 11, e.g. the Internet. The client to can execute a JavaScript app running in a web browser or a dedicated application to connect to the data center.

In such environments, it can make sense to delegate the responsibility of configuring proxy servers to each of microservice to create a self-managed system instead of centralizing the configuration logic to a controller or orchestrator, which can easily become a bottleneck or single point-of-failure.

Docker is an example of a container runtime that has recently gained popularity. By allowing container images to be stacked in a so-called union file system, container images can efficiently be distributed. Union file system also opens up for a mechanism called process injection. Process injection makes it possible to transparently implant additional processes into a container image, for example a self-configuration mechanism to manage proxy servers.

Here each routing container 14a-b functions as a reverse proxy with a front-end directed towards the client, i.e. upwards in FIG. 2, and a back-end directed towards resources, i.e. downwards in FIG. 2.

Figures 3, 4:
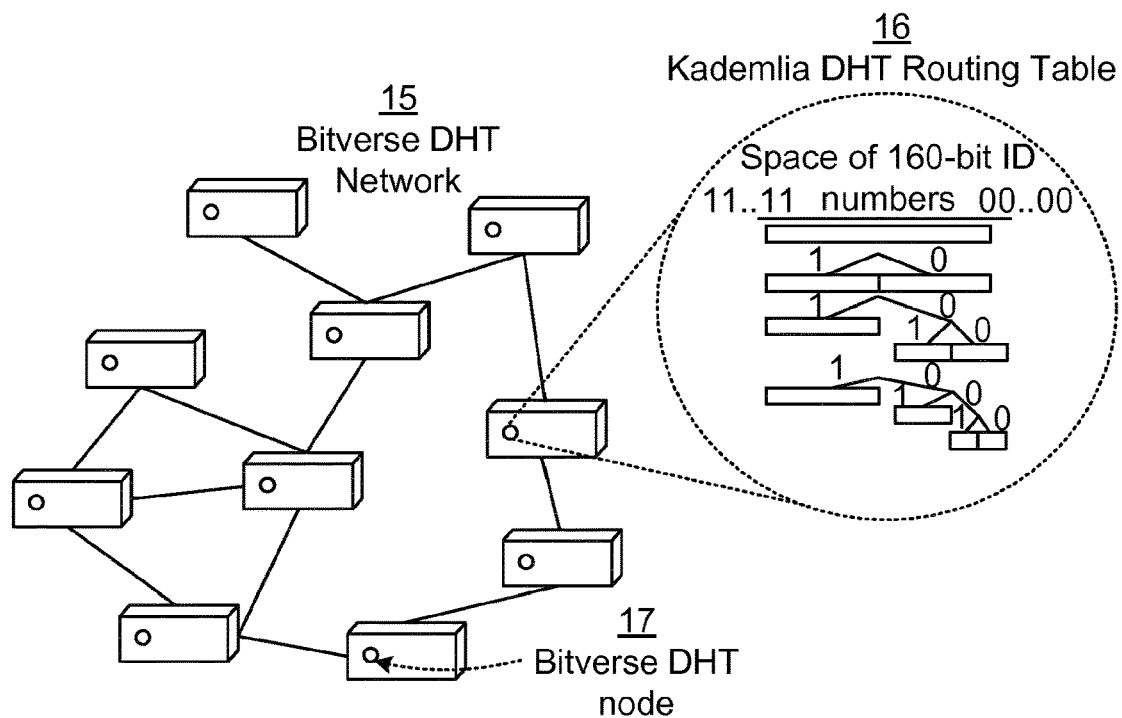
FIG. 3 is a schematic diagram illustrating a Bitverse P2P (peer-to-peer) network based on Kademlia.
FIG. 4 is a schematic diagram illustrating distributed hash tables used in embodiments presented herein.

FIG. 3 is a schematic diagram illustrating a P2P network based on Kademlia called Bitverse. Bitverse is a framework to build decentralized peer-to-peer application. Bitverse is based on the Kademlia DHT algorithm although it would be possible to use other DHT algorithms such as Chord or Pastry. However, the purpose of this section is rather to serve as a generic requirement specification of the underlying DHT framework as well as make it easier to understand pseudo code later presented.

Bitverse consists of two different types of nodes, super nodes and edge nodes. (It would also be possible to use only super nodes, but then NAT (Network Address Translation) traversal techniques are adopted to connect the super nodes together if they are located behind firewalls.) Edge nodes are connected using Web sockets to a super node and thus form a star topology. An edge node can either run as a library in a web browser client or in a server component directly. To provide a complete de-centralized solution, the containers themselves can operate the super nodes, but it would also be possible to run the super nodes separately to setup an external Bitverse network.

Super nodes communicate using UDP (User Datagram Protocol). Messages are routed using a routing table 16 provides by Kademlia. The routing table 16 consists of 160 buckets where each bucket consists of limited list of contacts (typically 20) discovered by the super node. XOR (Exclusive Or) is used to determine the distance between two different nodes in the network and which bucket a contact should be stored in. This makes it possible to implement an iterative protocol where a node calculates which contacts in its routing table that has the shortest distance to a particular string, or the SHA-1 (Secure Hash Algorithm 1) of the string to be more specific. These contacts are then queries until there are no more nodes to query. This makes it possible to find the nodes in the whole network that has the shortest distance to a particular string. Like all DHTs, this procedure is very efficient, typically O(log n) messages need to be sent, where is n is the number of nodes in the network and O indicates order.

By calculating a SHA-1 of the key it becomes possible to calculate which nodes in the network a particular key-value pair should be stored or located, and thus implement distributed data storage where data is replicated in the Bitverse network on several super nodes. In Bitverse, the value is represented as an unordered set, which makes it possible to store multiple values associated with a specific key. This special key-value(s) pair is called a SetMap. Below is an example of SetMap named "hello", storing 5 values identified by the key "mykey".

"hello"=>{value2, value1, value5, value4, value3}

The SetMap provides a simple key-values store API, e.g.

setmap=bitverse.getSetMap ("hello")

setMap.AddValue ("mykey", "value6")

It is also possible to set a time-to-live (TTL) on a value stored in a SetMap, e.g.

setMap.AddValueTTL ("mykey", "value7", 2)

In this case, value7 is automatically purged after 2 seconds.

It is also possible to track a specific key and receive events when a value is added or removed, e.g.

setMap.TrackKey ("mykey", func(all, added, removed) { })

The func(all, added, removed) is a closure function that is called for each event. It is also called the very first time the TrackKey function is called. This can be used to initialize an algorithm by iterating the all argument, which contains all values for the key.

The TTL mechanism combined with this tracking mechanism provides the foundation to implement a distributed and decentralized service discovery mechanism. If a client stops adding a specific value with a TTL, the value will automatically be purged when the TTL expired, thus causing a tracking event to other clients which can then take appropriate actions, such as re-configure a proxy server.

FIG. 4 is a schematic diagram illustrating distributed hash tables, implemented as Bitverse SetMaps, used in embodiments presented herein. The SetMaps are accessed by the routing agents and the service agents.

When a routing agent is started it is provided with Bitverse credentials, whereby the routing agent can obtain configuration information published by developers/operators or service agents running in deployed microservice containers. The routing agent and service agent interacts using three different SetMaps. A Microservices SetMap 20 contains microservice IDs currently in use. Microservice ID (or microservice identity) is the identity of a particular microservice. The microservice provides a function and is accessible externally using embodiments presented herein.

As explained in more detail below, each microservice ID can be implemented in many instances, which is reflected in the containers SetMap 22.

In the example of FIG. 4, there are two different microservice IDs registered; cmm and statistics. By tracking the microservices key in the Microservices SetMap, routing agents can find out which microservice IDs are in use, and re-configure the internal proxy when new microservice IDs are introduced or removed.

The Containers Setmap 22, contains connection information (IP address and ports) to different containers providing a certain microservice ID. Note that there can be many containers providing the same microservice ID. In this case, the routing container load balances the traffic between the containers.

The Protocol Settings SetMap 21 contains configuration information needed to configure the internal proxy server, for example which protocol to use (e.g. TCP or HTTP etc.), sticky session attributes, or frontend postfix paths (or regexp) that should be proxied to the containers of a specific microservice ID. In the example of FIG. 4, the path HTTP/stat is proxied to the (target) path/on the containers at 192.168.18.34:1111 and 192.168.23.217:2222. This utilises both the protocol settings SetMap 21 and the containers SetMap, using the 'statistics' key. Since two containers provide the statistics microservice ID, incoming traffic will be load balanced between the two containers.

Note that the values (e.g. cmm) of the microservices key in the Microservice SetMap 20 are used as keys to lookup running containers in the Containers SetMap 22 or lookup protocol configuration in the Protocol Settings SetMap 21.

When a routing agent is first started it looks up all protocol settings for every microservice ID it knows about. For each microservice ID, it configures the proxy server accordingly, i.e. configure postfix paths and any other frontend related settings. It then looks up the Container SetMap to find out which containers provide this microservice ID. All discovered containers are added as backend servers mapping to the microservice ID in the proxy server configuration.

Optionally, by using the tracking mechanism provided by Bitverse, the routing agent can receive events when different SetMaps are modified. The tracking mechanism can be used by e.g. getting a message when a value has been updated in Bitverse's DHT. This entry in the hash table contains both the value(s) and a list of SHA-addresses of all subscribers. So if anyone changes that value Bitverse knows to whom a message should be sent. So, to use the tracking mechanism it is only required to register the relevant edge node as a subscriber.

For example, an event is received when a new container is deployed, and can thus dynamically add the container as a backend server to proxy server.

The role of service agents, which run in the microservice containers, is to resolve the IP address and port(s) of the hosted microservice by asking the underlying platform. It then publishes the resolved IP and port(s) to the Container SetMap. As previously described, this will generate an event to the routing agent(s), which will re-configure and restart the proxy servers in the routing containers. Note that the service agents need to know which microservice ID they are representing for this to work. The microservice ID can either be set when implanting the service agent, or it can be set as an environmental variable when deploying a microservice container.

The following pseude code illustrates how the service agents and routing agents interact. The procedure is called the Dynamic Proxy Reconfiguration Algorithm and is reflected in the flow charts of FIGS. 5A-B and FIGS. 6A-B. Note that the steps indicated in the code below relates to the steps of the flowchart of FIG. 5A and FIG. 6B.

Dynamic Proxy Reconfiguration Algorithm

```
microserviceIDs = bitverse.getSetMap("microserviceIDs")
containers = bitverse.getSetMap("containers")
protocolSettings = bitverse.getSetMap("protocolSettings")
firstTime = true
microserviceIDs.TrackKey("microserviceIDs",
func (allMicroserviceIDs, // STEP 53 and STEP 58
                     (can be done in one operation)
    addedMicroserviceID,
    removedMicroserviceID) {
    if firstTime {
        for each microserviceID in allMicroserviceIDs { // STEP 59
            protocolSetting =
                protocolSettings.GetValue(microserviceID) // STEP 51
            proxyServer.addFrontend(addedMicroserviceID,
                protocolSettings) // STEP 52
            trackMicroservice(microserviceID)
        }
        firstTime = false
    } else {
        if addedMicroserviceID { // STEP 55
            protocolSetting =
                protocolSettings.GetValue(addedMicroserviceID)
                    // STEP 51
            proxyServer.addFrontend(addedMicroserviceID,
                protocolSettings) // STEP 52
            trackMicroservice(addedMicroserviceID)
        } else if removedMicroserviceID { // STEP 56
            proxyServer.removeFrontend(removedMicroserviceID)
                // STEP 57
        }
    }
})
func trackMicroservice(microserviceID) {
    firstTime = false
    containerTable.TrackKey(microserviceID, func(allContainers,
        // STEP 52 and STEP 60 (can be
        // done in one operation)
        addedContainer,
        removedContainer ) {
        if firstTime {
            for each container in allContainers { // STEP 52
                proxyServer.addBackend(microserviceID, container.IP,
                    container.Ports) // STEP 52
            }
        } else {
            if addedContainer { // STEP 62
                // STEP 64
                proxyServer.addBackend(microserviceID,
                    addedContainer.IP, addedContainer.Ports)
            } else if removedContainer // STEP 63
                proxyServer.removeBackend(microserviceID, //
                STEP 65
                    removedContainerIP,
                    removedContainer.Ports)
        }
    })
}
```

Service agents running in the containers then need to register to the Containers SetMap.

```
containers = bitverse.getSetMap("containers")
myIP = platform.resolveIP(...) // STEP 40
myPorts = platform.reseovlePorts(...) // STEP 40
for ever {
    containers.addValueTTL(microserviceID, myIP + myPorts, TTL)
    // STEP 42
    sleep(TTL/2) // STEP 43
}
```

The service agents set a TTL on the value (myIP+myPorts) and re-add it periodically, which cause Bitverse to automatically remove the container connection information from the Containers Setmap if a container terminates and stops re-adding the value.

Note that there is only a weak relationship between the service agents and the routing agents, as they only indirectly communicate using Bitverse SetMaps. This makes it possible to deploy new microservice containers or routing container in a plug-and-play fashion. It is also possible, as discussed below, to allow microservice containers to dynamically add and configure routing containers.

Dynamically Creating Clusters

In some case it can make sense to allow a microservice container to configure or even deploy new routing containers, to create a self-reprogrammable microservice infrastructure. For example, a videoconference microservice could generate a temporary URL to a conference room that expires after some time. By modifying the Protocol Settings SetMap 21, it becomes possible to add or change a URL to a particular microservice, thus making it possible for a microservice to generate a temporary URL.

It could also be possible for a microservice to detect that it is overloaded. The overload detection could be service dependent. The detection could be done by measuring the CPU (Central Processor Unit) load in the container or numbers of connections or maybe based on some time measurements (e.g. a response should always be generated within X milliseconds).

It could then configure and deploy a routing container and add more instances of itself to dynamically create a cluster. Traditionally, centralized orchestrators have been responsible for doing this task. However, the presented embodiments open up for creating a decentralized system by injecting suitable tools where the containers themselves can setup and manage clusters, which could be a more scalable and robust solution in some situations. Note that this requires that the containers can access the platform and have permission to deploy containers, which may require stronger security management frameworks.

Another feature of the proposed embodiments is that is possible for a microservice container to find out which routing containers are currently in used and how they are configured. By looking up the proxy_servers key in the microservices SetMap 20, it is possible for a microservice to introspectively find out the public IP+Port (or domain name) of a routing container. A microservice can then notify clients about how to connect to it from the public Internet. The notification can be achieved since the microservice has access to the information used to configure the proxy (such as an HA proxy), its external IP address can be included, for instance, when a microservice responds to client requests.

This means that a microservice can deploy a new routing container and then track the proxy_server key in the microservices SetMap 20 to receive an event when the new routing container is up and running and then start using it. This kind of introspection makes it possible to create re-programmable microservices infrastructure, which could open up for new interesting design patterns, providing great dynamic flexibility compared to the prior art.

Figure 5A:
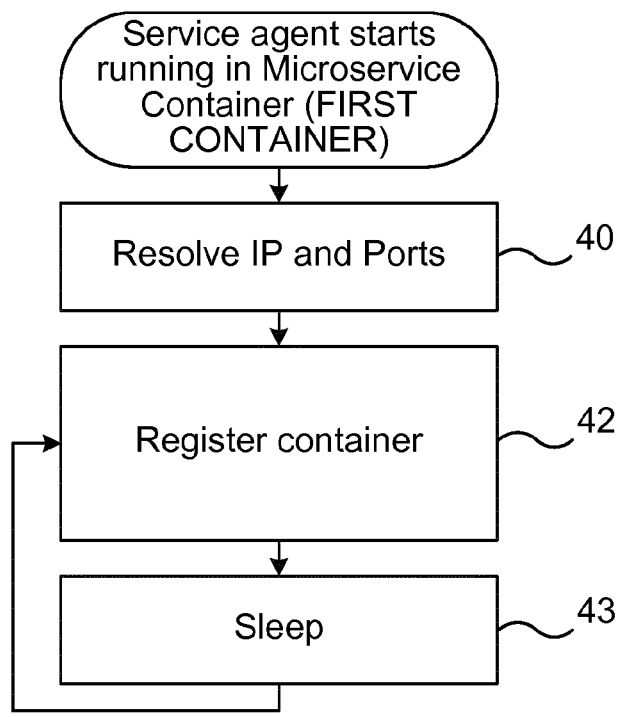
FIGS. 5A-B are flow charts illustrating methods performed by a first software container to register itself for use with a reverse proxy.
Figure 5B:
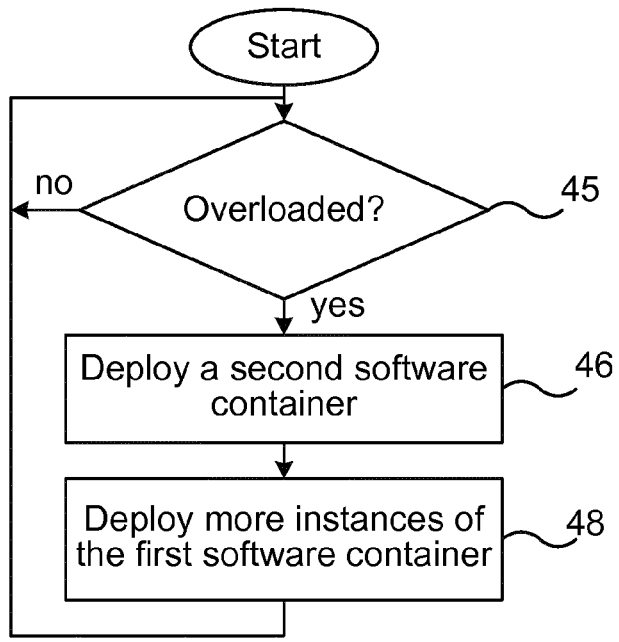

FIGS. 5A-B are flow charts illustrating methods performed by a first software container to register itself for use with a reverse proxy. Looking first to FIG. 5A this method is performed in a service agent, which is an implanted agent as described above and illustrated in FIG. 2.

When the method starts, the service agent is running in a microservice container, here denoted a first software container.

In a resolve IP and ports step 40, the IP address and port of the first software container is resolved, i.e. obtained from the environment executing the first software container.

In a register container step 42, the container is registered to the containers SetMap 22 with the configured microservice ID and optionally TTL in association with the microservice ID. Hence the microservice identity (also denoted microservice ID), the IP address and the port of the first software container is registered in a first distributed hash table, such as the containers SetMap 22. This registration enables a second implanted agent (such as the routing agent) running in a second software container to configure a reverse proxy running in the second software container. In other words, the first distributed hash table contains the IP address and port of the container of the service agent so that a second implanted agent (the routing agent) running in a second software container can configure a reverse proxy running in the second software container.

In a sleep step 43, the service agent enters a sleep mode, or inactive mode. The duration of the sleep should be less than the TTL in order to be able to reactivate the registration in the SetMap 22.

The method then repeats by returning to the register container step 42 (or optionally to the resolve IP and ports step 40).

Looking now to FIG. 5B, this flow chart illustrates an optional process performed by the first software container.

In an optional conditional overloaded step 45, it is determined whether the first software container experiences overloading. The overload detection could be service dependent. As explained above, the detection could be done by measuring the CPU load in the container or numbers of connections or based on some time measurements (e.g. a response should always be generated within X milliseconds). If the first software container is determined to be overloaded, the method continues to a deploy a second software container step 46. Otherwise, the method returns to the optional conditional overloaded step 45, optionally via delay (not shown).

In the optional deploy a second software container step 46, a second software container is deployed for configuring a reverse proxy server. The second software container contains a routing agent, which is described in more detail above.

In an optional deploy more instances for the first software container step 48 at least one more instance of the first software container is deployed.

Figure 6A:
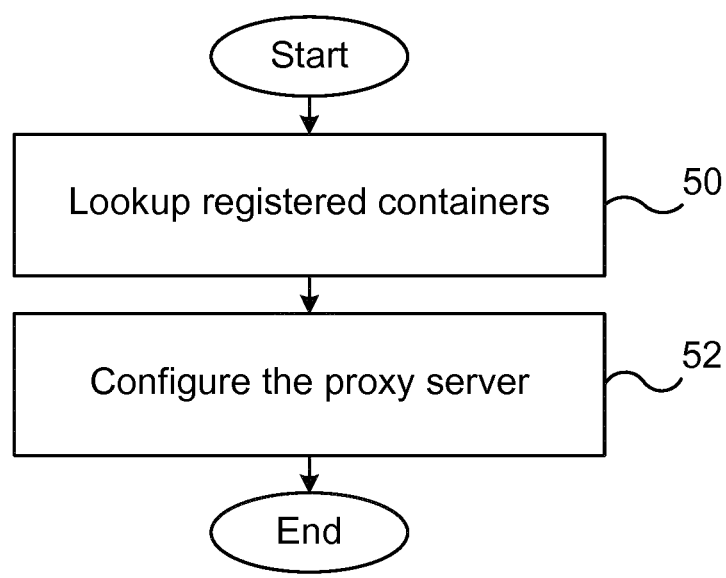
FIGS. 6A-B are flow charts illustrating methods performed by a second software container to configure a reverse proxy.
Figure 6B:
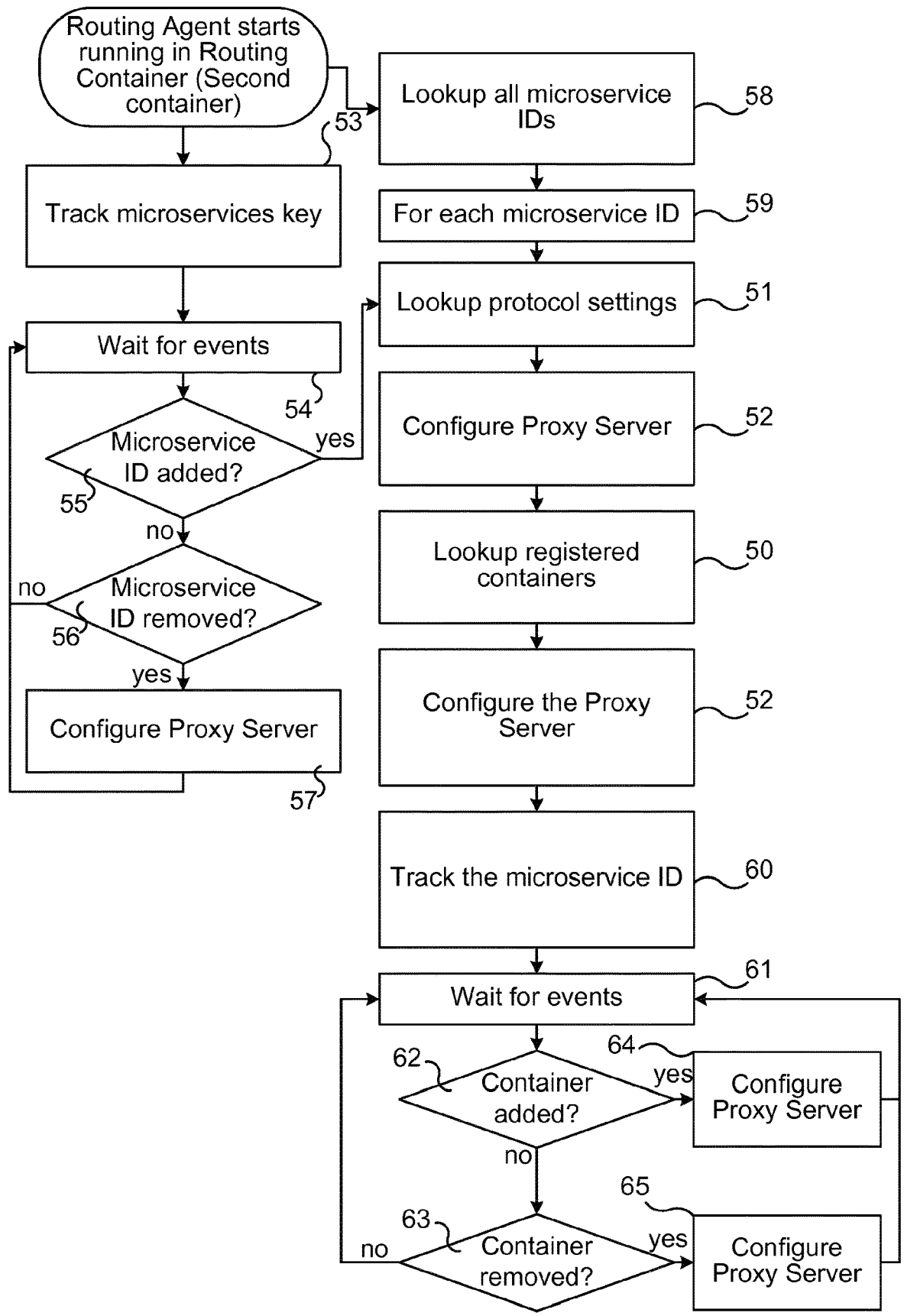

FIGS. 6A-B are flow charts illustrating methods performed by a second software container to configure a reverse proxy. The method illustrated in FIG. 6A is described first. The second software container comprises a second implanted agent, such as the routing agent. The method is performed by the second implanted agent.

In a lookup registered containers step 50, a microservice identity registered in a first distributed hash table is obtained. The microservice identity has been registered by the first implanted agent of the first software container as described above. Hence, this step comprises a lookup of registered containers for a microservice identity in the DHT, such as the containers SetMap 22.

In a configure proxy server step 52, a reverse proxy running in the second software container is configured using the microservice identity.

Looking now to FIG. 6B, this is an extended embodiment also comprising the steps of FIG. 6A, which will not be described again.

When the method starts, the routing agent is running in the routing container, which is also called the second software container herein.

In an optional track microservices key step 53, the microservices key is tracked in the microservices SetMap 20 to receive events when microservice IDs are added or removed.

In an optional wait for events step 54, the method waits until an event tracked in step 53 occurs. When an event occurs, the method continues to an optional conditional microservice ID added step 55.

In the optional conditional microservice ID added step 55, it is determined whether the event concerns an added microservice ID. If this is the case, the method continues to an optional lookup protocol settings step 51 and performs this step for the added microservice ID. If the event does not concern an added microservice ID, the method continues to an optional conditional microservice ID removed step 56.

In the optional conditional microservice ID removed step 56, it is determined whether the event concerns a removed microservice ID. If this is the case, the method continues to an optional configure proxy server step 57. Otherwise, the method returns to the optional wait for events step 54.

In the optional configure proxy server step 57, the proxy server configuration is updated by removing the microservice ID of the event from the proxy frontend.

In an optional lookup all microservice IDs step 58, all microservice IDs in the microservices SetMap 20 are looked up, using the microservices key.

In an optional for each microservices ID step 59, a loop is started for each microservice ID found in optional step 58. The remaining steps are performed for each one of the microservice IDs.

In the optional lookup protocol settings step 51, the routing agent looks up protocol settings for the microservice ID in the protocol settings SetMap 21 with the microservice ID in question as the key.

In the optional configure proxy server step 52, the routing agent configures the proxy server by configuring the frontend according to the protocol settings obtained in step 51.

In an optional track microservice ID step 60, the microservice ID in question is tracked in the container SetMap 22. To get events when containers are added or removed.

In an optional wait for events step 61, the method waits until an event tracked in step 60 occurs. When an event occurs, the method continues to an optional conditional container added step 62.

In the optional conditional container added step 62, it is determined whether the event concerns an added container. If this is the case, the method continues to an optional configure proxy server step 64. Otherwise, the method continues to an optional conditional container removed step 63.

In the optional conditional container removed step 63, it is determined whether the event concerns a removed container. If this is the case, the method continues to an optional configure proxy server step 65. Otherwise, the method returns to the wait for events step 61.

In the optional configure proxy server step 64, the proxy server configuration is updated by adding the container as a proxy backend.

In the optional configure proxy server step 65, the proxy server configuration is updated by removing the container from the proxy backend.

Figure 7:
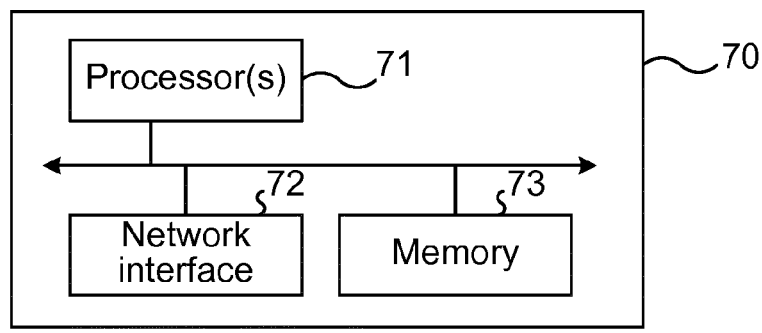
FIG. 7 is a schematic diagram illustrating components of a server which can be used to execute routing agents and/or service agents of FIG. 2.

FIG. 7 is a schematic diagram illustrating components of a server 70 which can be used to execute routing agents and/or service agents of FIG. 2. As illustrated, the server 70 includes at least one processor 71 that is coupled to a network interface 82 via an interconnect. A memory 73 can be implemented by a hard disk drive, flash memory, or read-only memory and stores computer-readable instructions. The at least one processor 71 executes the computer-readable instructions and implements the functionality described above. The network interface 72 enables the server 70 to communicate with other nodes within the network. Alternative embodiments of the present invention may include additional components responsible for providing additional functionality, including any functionality described above and/or any functionality necessary to support the solution described above.

Figure 8:
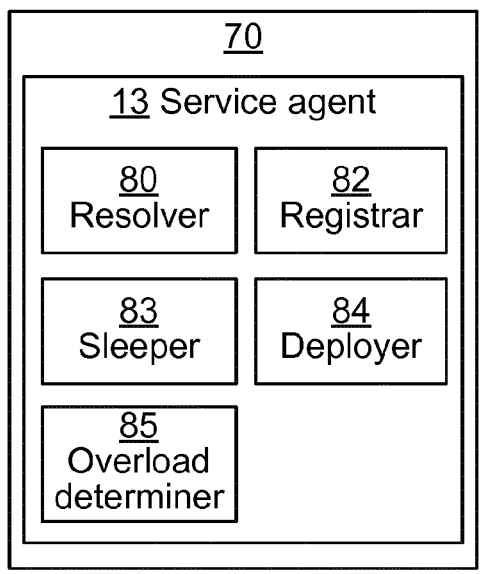
FIG. 8 is a schematic diagram showing functional modules of the service agent of the server of FIG. 7 according to one embodiment.

FIG. 8 is a schematic diagram showing functional modules of the service agent of the server of FIG. 7 according to one embodiment. The modules are implemented using software instructions such as a computer program executing in the server 70. Alternatively or additionally, the modules can be implemented using hardware, e.g. using an Application Specific Integrated Circuit (ASIC), Field Programmable Gate Array (FPGA) and/or discrete logical components. The modules correspond to the steps in the methods illustrated in FIGS. 5A and 5B.

A resolver 80 corresponds to step 40. A registrar 82 corresponds to step 42. A sleeper 83 corresponds to step 43. A deployer 84 corresponds to steps 46 and 48. An overload determiner 85 corresponds to step 45.

Figure 9:
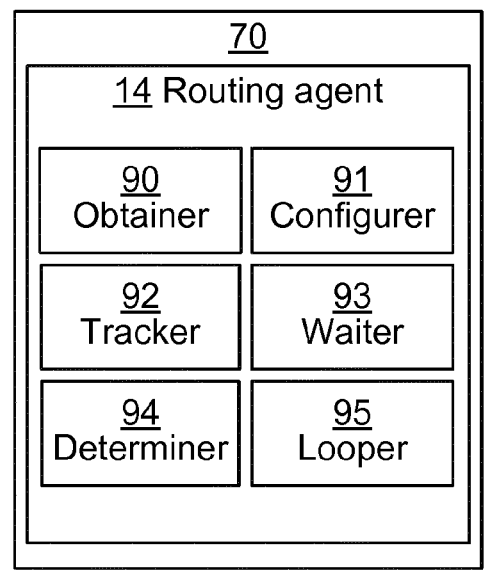
FIG. 9 is a schematic diagram showing functional modules of the routing agent of the server of FIG. 7 according to one embodiment.

FIG. 9 is a schematic diagram showing functional modules of the routing agent of the server of FIG. 7 according to one embodiment. The modules are implemented using software instructions such as a computer program executing in the server 70. Alternatively or additionally, the modules can be implemented using hardware, e.g. using an Application Specific Integrated Circuit (ASIC), Field Programmable Gate Array (FPGA) and/or discrete logical components. The modules correspond to the steps in the methods illustrated in FIGS. 6A and 6B.

An obtainer 90 corresponds to steps 50, 51 and 58. A configurer 91 corresponds to steps 52, 57, 64 and 65. A tracker 92 corresponds to steps 53 and 60. A waiter corresponds to steps 54 and 61. A determiner corresponds to steps 55, 56, 62 and 63. A looper corresponds to step 59.

Figure 10:
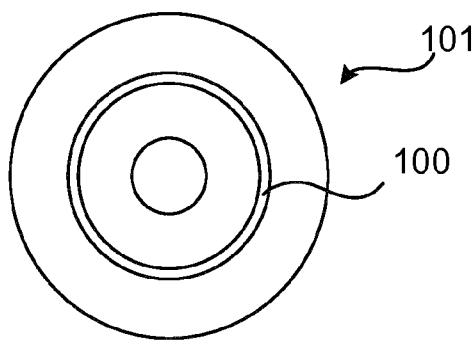
FIG. 10 shows one example of a computer program product comprising computer readable means.

FIG. 10 shows one example of a computer program product 101 comprising computer readable means. On this computer readable means a computer program 100 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the memory 73 of FIG. 7. While the computer program 100 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a second software container comprising a second implanted agent, the method comprising:

the second implanted agent obtaining a microservice identity registered in a first table, the microservice identity having been registered by a first implanted agent of a first software container; and the second implanted agent configuring a reverse proxy running in the second software container using the microservice identity, wherein configuring the reverse proxy using the microservice identity comprises:

the second implanted agent using the microservice identity to obtain from a second table: i) a registered protocol type associated with the microservice identity, ii) a registered frontend postfix path associated with the microservice identity, and iii) a registered target path associated with the microservice identity; and the second agent configuring the reverse proxy to use the registered protocol type, the registered frontend postfix path, and the registered target path.

2. The method of claim 1, wherein the step of obtaining comprises obtaining an Internet Protocol (IP) address and port number of the first software container stored in association with the microservice identity; and wherein the step of configuring the reverse proxy comprises using the IP address and port number.

3. The method of claim 1, further comprising:

configuring the reverse proxy running in the second software container by removing an absent microservice identity from the proxy when the absent microservice identity has been removed from the first distributed hash table.

4. A data processing system comprising:

a processor; and a memory storing instructions that, when executed by the processor, cause the data processing system to:

obtain a microservice identity registered in a first table, the microservice identity having been registered by a first implanted agent of a first software container; and configure a reverse proxy running in a second software container using the microservice identity, wherein the data processing system is configured to configure the reverse proxy using the microservice identity by performing a process that comprises:

using the microservice identity to obtain from a second table: i) a registered protocol type associated with the microservice identity, ii) a registered frontend postfix path associated with the microservice identity, and iii) a registered target path associated with the microservice identity; and configuring the reverse proxy to use the registered protocol type, the registered frontend postfix path, and the registered target path.

5. The data processing system of claim 4, wherein the data processing system is further configured to obtain an IP address and port of the first software container stored in association with the microservice identity and use the IP address and port number.

6. The data processing system of claim 4, further comprising instructions that, when executed by the processor, cause the data processing system to:

configure the reverse proxy by removing an absent microservice identity from the proxy when the absent microservice identity has been removed from the first distributed hash table.

* * * * *